(12) United States Patent
Boodaghians et al.

(10) Patent No.: US 10,308,361 B2
(45) Date of Patent: Jun. 4, 2019

(54) DISPOSABLE MODULAR RESERVOIR

(71) Applicant: MAG AEROSPACE INDUSTRIES, LLC, Carson, CA (US)

(72) Inventors: Razmik B. Boodaghians, Glendale, CA (US); Andrew Chan, Alhambra, CA (US); Sung Hong, Los Angeles, CA (US)

(73) Assignee: MAG Aerospace Industries, LLC, Carson, CA (US)

( * ) Notice: Subject to any disclaimer, the term of this patent is extended or adjusted under 35 U.S.C. 154(b) by 0 days.

(21) Appl. No.: 15/518,103

(22) PCT Filed: Dec. 2, 2015

(86) PCT No.: PCT/US2015/063342
§ 371 (c)(1),
(2) Date: Apr. 10, 2017

(87) PCT Pub. No.: WO2016/089947
PCT Pub. Date: Jun. 9, 2016

(65) Prior Publication Data
US 2017/0305552 A1    Oct. 26, 2017

Related U.S. Application Data

(60) Provisional application No. 62/086,290, filed on Dec. 2, 2014.

(51) Int. Cl.
*E03C 1/12* (2006.01)
*E03F 1/00* (2006.01)
(Continued)

(52) U.S. Cl.
CPC ............ *B64D 11/02* (2013.01); *A47J 31/4403* (2013.01); *A47J 31/4457* (2013.01); *B60R 15/00* (2013.01);
(Continued)

(58) Field of Classification Search
CPC ... B64D 11/02; A47J 31/4403; A47J 31/4457; B60R 15/00; B60R 15/04; E03C 1/12; E03F 1/006
(Continued)

(56) References Cited

U.S. PATENT DOCUMENTS 4,162,218 A * 7/1979 McCormick ............ C02F 1/006
210/104
5,035,011 A * 7/1991 Rozenblatt ............ B64D 11/02
4/316
(Continued)

FOREIGN PATENT DOCUMENTS

GB    1215553 A    12/1970
JP    2005092394 A   4/2005

OTHER PUBLICATIONS

International Patent Application No. PCT/US2015/063342, Search Report and Written Opinion, dated Mar. 17, 2016.

*Primary Examiner* — Benjamin R Shaw
(74) *Attorney, Agent, or Firm* — Kilpatrick Townsend & Stockton LLP; Dean W. Russell; Kristin M. Crall

(57) ABSTRACT

Embodiments of the present disclosure relate generally to a reservoir (40) that is easily removed from a grey water flush system. The reservoir is made modular so that rather than removing an entire reservoir/pump/circuitry system, the reservoir (40) can be separately removed from the system. The reservoir can also be made disposable, which can save cleaning and refurbishment costs. This can also increase turn-around time for maintenance of the system.

10 Claims, 13 Drawing Sheets

(51) Int. Cl.
  *B64D 11/02* (2006.01)
  *B60R 15/00* (2006.01)
  *A47J 31/44* (2006.01)
  *B60R 15/04* (2006.01)

(52) U.S. Cl.
  CPC ............... *E03C 1/12* (2013.01); *E03F 1/006* (2013.01); *B60R 15/04* (2013.01)

(58) Field of Classification Search
  USPC ............................................................. 4/316
  See application file for complete search history.

(56) References Cited

U.S. PATENT DOCUMENTS

| | | | |
|---|---|---|---|
| 5,192,004 A | 3/1993 | Burrows | |
| 5,251,346 A * | 10/1993 | Donati | E03B 1/04 |
| | | | 4/665 |
| 5,390,826 A | 2/1995 | Burrows | |
| 5,557,812 A * | 9/1996 | Sayant | E03B 1/04 |
| | | | 4/665 |
| 5,613,625 A * | 3/1997 | Specht | A47K 5/12 |
| | | | 222/180 |
| 5,632,418 A * | 5/1997 | Brown | A47K 5/1202 |
| | | | 222/153.09 |
| 7,533,426 B2 | 5/2009 | Pondelick | |
| 2002/0053104 A1* | 5/2002 | Rump | E03D 5/105 |
| | | | 4/313 |
| 2004/0010843 A1* | 1/2004 | Erdmann | B64D 11/02 |
| | | | 4/321 |
| 2004/0035768 A1* | 2/2004 | Bertram | B01D 29/23 |
| | | | 210/112 |
| 2004/0138326 A1 | 7/2004 | Arnold et al. | |
| 2006/0225200 A1* | 10/2006 | Wierenga | B60R 15/00 |
| | | | 4/664 |
| 2007/0044225 A1* | 3/2007 | Palacios | A45D 19/04 |
| | | | 4/516 |
| 2007/0151020 A1* | 7/2007 | Pondelick | B64D 11/02 |
| | | | 4/665 |
| 2007/0174959 A1* | 8/2007 | Sanders | E03D 5/003 |
| | | | 4/665 |
| 2009/0025756 A1* | 1/2009 | Zanolli | B08B 7/02 |
| | | | 134/34 |
| 2011/0215114 A1* | 9/2011 | Liccioni | B67D 3/0032 |
| | | | 222/146.6 |
| 2012/0060271 A1* | 3/2012 | Dannenberg | B64D 11/02 |
| | | | 4/321 |
| 2012/0125443 A1* | 5/2012 | Borg | |
| 2012/0285563 A1* | 11/2012 | Platteel | E03B 1/04 |
| | | | 137/561 R |
| 2013/0305444 A1 | 11/2013 | Boodaghians et al. | |
| 2014/0021112 A1* | 1/2014 | Boodaghians | C02F 1/008 |
| | | | 210/102 |
| 2014/0069353 A1 | 3/2014 | Jimenez | |
| 2015/0040311 A1* | 2/2015 | Hennings | B64D 11/02 |
| | | | 4/668 |
| 2015/0361648 A1 | 12/2015 | Boodaghians et al. | |

* cited by examiner

DISPOSABLE MODULAR RESERVOIR

CROSS REFERENCE TO RELATED APPLICATIONS

This application is the U.S. national stage of International Application No. PCT/US2015/063342, filed Dec. 2, 2015, which application claims the benefit of U.S. Provisional Application Ser. No. 62/086,290, filed Dec. 2, 2014, titled "Disposable Reservoir and Filter for Waste," the entire contents each of which are hereby incorporated by reference.

FIELD OF THE DISCLOSURE

Embodiments of the present disclosure relate generally to a reservoir that is easily removed from a grey water flush system. The reservoir is made modular so that rather than removing an entire reservoir/pump/circuitry system, the reservoir can be separately removed from the system. The reservoir can also be made disposable, which can save cleaning and refurbishment costs. This can also increase turn-around tune for maintenance of the system.

BACKGROUND

Water and waste management on passenger transportation vehicles can present challenges. For example, disposing of grey water must be addressed, due to the additional weight associated with carrying the water on-board. This can be a particular concern for passenger airliners.

As background, "grey water" is a term that is generally used to refer to spent water from hand or face washing at a sink basin or faucet. The water may include detergents and soaps from hand washing. The water may also include liquids poured down a drain, such as unconsumed coffee, water, wine, juices, or other liquid items. Managing grey water can present particular challenges onboard passenger aircraft, and a number of solutions have been explored. Some aircraft have disposed grey water overboard, out through drain masts. This presents environmental challenges, due to undesirable materials that may be present in the grey water. This may also present aesthetic challenges, for example, if the grey water is laden with wine or other colored liquids, the colored liquids can "stain" or "paint" the side of the plane as they are discharged. This may also present technical challenges, depending upon the temperature of the liquid to be discharged and the temperature of the atmosphere. Improvements and alternative end uses or end locations for the grey water are desirable.

BRIEF SUMMARY

Embodiments of this disclosure provide improved reservoir systems for water systems. Certain embodiments provide a reservoir that is easily removed from a grey water flush system. The reservoir is made modular so that rather than removing an entire reservoir/pump/circuitry system, the reservoir can be separately removed from the system. The reservoir can also be made disposable, which can save cleaning and refurbishment costs. This can also increase turn-around time for maintenance of the system.

In some examples, there is provided a removable reservoir for a water system, comprising: a back plate skeleton configured to be mounted to a surface and comprising at least one attachment feature; a reservoir body comprising an inlet, at least one outlet, and a corresponding attachment feature for securement to the back plate skeleton, a water-tight clamp system for securing the inlet to a water pipe, wherein the water-tight clamp system allows a quick release of the reservoir body from the water pipe for removal and replacement of the reservoir body.

DETAILED DESCRIPTION

The present assignee has developed a grey water flush system. Its grey water flush (GWF) system includes a Grey Water Interface Valve (GWIV) for eliminating the disposal of grey water overboard from an aircraft. The GWIV shuttles grey water from lavatory and galley sinks to the waste tanks, rather than to overboard drain masts. Legacy drain masts have had high susceptibility to freezing due to extreme temperature conditions existing at altitude conditions. Discharge of grey water to the environment has also presented environmental and aesthetic issues. Introduction of the grey water flush technology allows aerospace operators to mitigate this concern and create a more green-friendly aircraft. One example of a GWIV is described by U.S. Pat. No. 7,533,426.

From this initial introduction of grey water technology, improvements upon sustainability efforts have continued to be investigated, including the potential reuse of grey water on board the vehicle. Initial investigations into grey water technology revealed that water used in lavatory and galley sinks accounts for up to about 30% of the overall water used in aircraft. Developing methods to re-use the water allocated for flights could lead to a potential reduction in overall water usage on the aircraft. This understanding of grey water technology has led to development of the grey water flush system to clean, filter, and reuse grey water to flush the toilet. The GWF system may be implemented primarily in lavatories to reduce grey water settling time and to minimize the travel of water to the toilet.

Figure 1A:
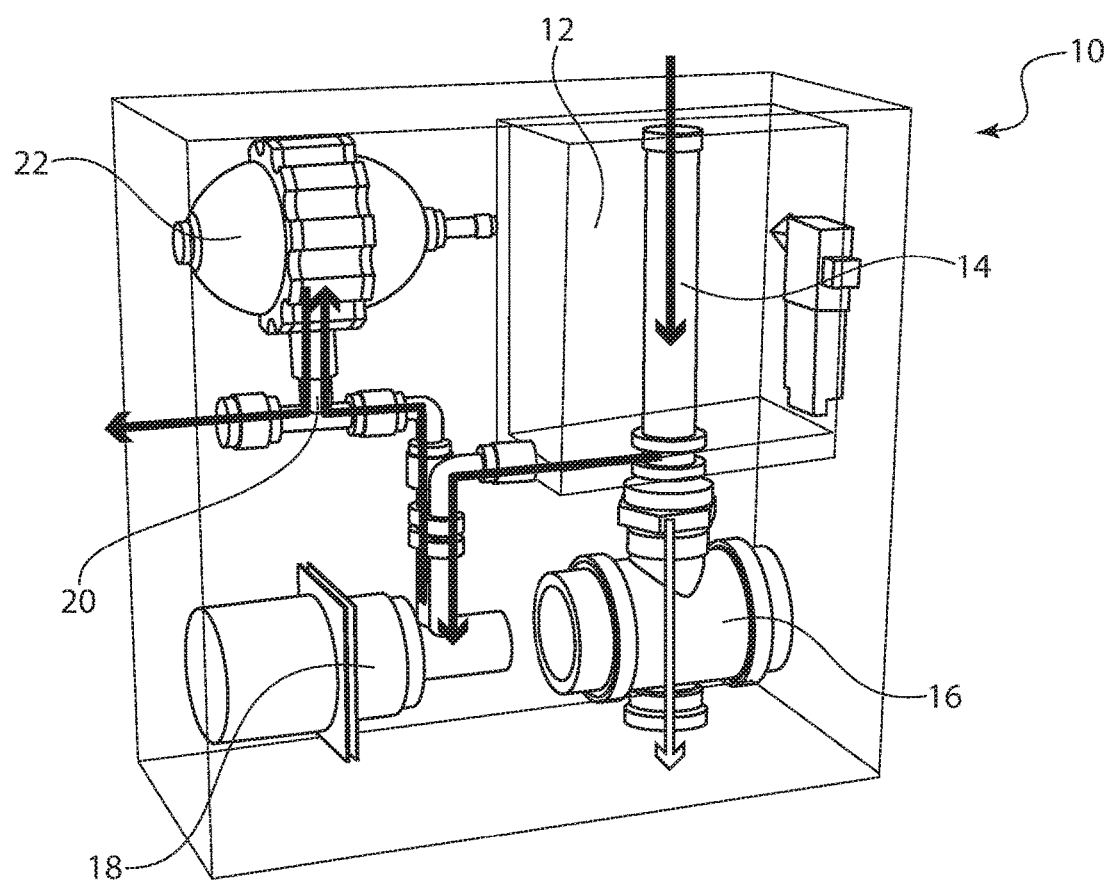
FIG. 1A shows a perspective view of one embodiment of a grey water flush system.

The GWF system improved upon the GWIV's design, while limiting overall impact into lavatory integration. One of the risks of system installation into the aircraft is changing any existing interfaces in the lavatory, either in the plumbing or electrical systems. To limit the amount of integration changes required, the GWF system uses the toilet's dedicated power line. However, due to sharing a power source, the GWF system requires a smaller pumping mechanism to generate required pressure and flow for a clean toilet flush. This restriction was overcome through the implementation of a pump and accumulator pressurization system, as described in co-pending U.S. application Ser. No. 14/731,689 titled "Accumulator for Water Management." FIG. 1A illustrates the initial conceptualization of the GWF system 10 including the grey water reservoir 12, a filter cartridge 14, vacuum-operated pinch valve 16, a grey water pump 18, a check valve 20, and an accumulator 22.

Figure 1B:
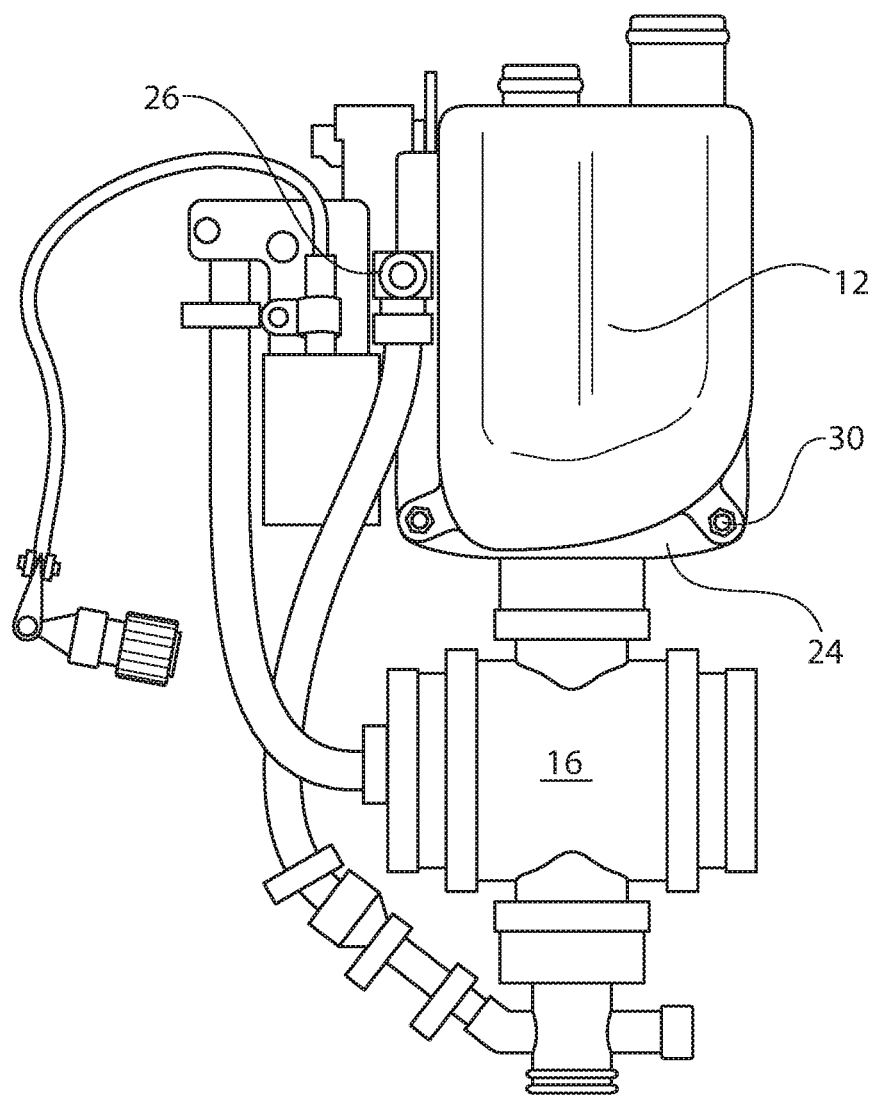
FIG. 1B shows a front plan view of a current reservoir/pump/circuitry system.

As illustrated by FIG. 1B, the current standard is for the grey water reservoir 12 to have its rear face 24 extend out and form a platform 26 that provides a shared surface for mounting of electrical components. The platform 26 also serves a mounting function for mounting of the reservoir 12/pinch valve 16 system with respect to the laboratory or galley surface. The platform 26 is shown having mounting features 30.

The embodiments described may be located within lavatories, galleys, or any other locations that typically collect water on board a passenger transportation vehicle. The system generally collects grey water from a sink or other water-generating system, and routes that grey water appropriately. In some instances, the grey water may be routed to the main waste tank for disposal. In other instances. the grey water may be filtered for re-use.

Figure 2A:
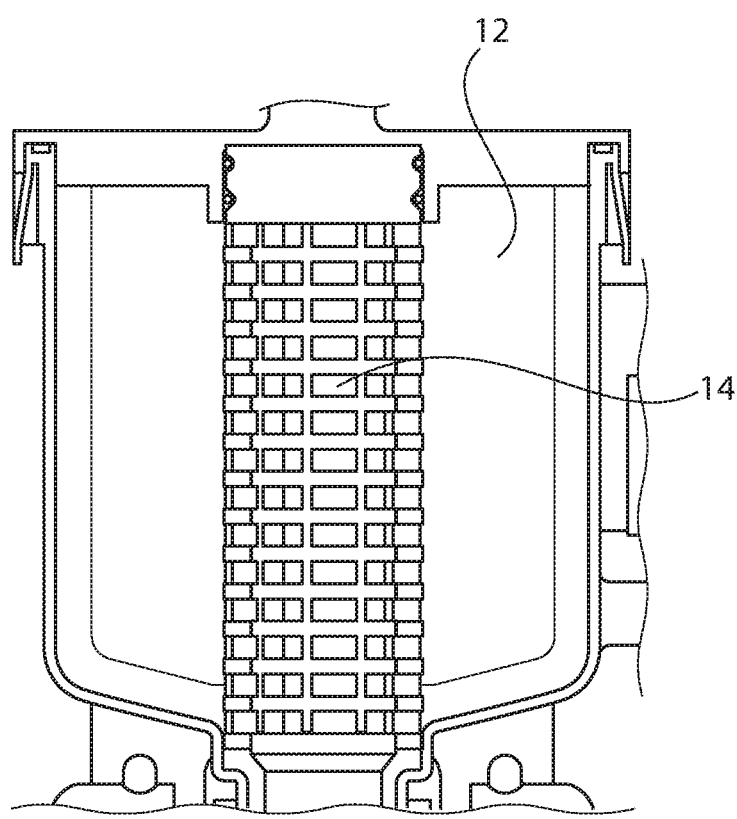
FIG. 2A shows a cut away view of the reservoir of FIG. 2B.

If the grey water is to be filtered, the reservoir 12 portion of the GWF system 10 may be fitted with a filter 14. One example is illustrated by FIG. 2A. The filter cartridge 14 is typically removed and disposed of at regular intervals. The replacement interval may depend upon the predicted lifespan of the filter and any accompanying washing mechanisms or systems that may be provided. (For example, one example of a filter cleaning system is described in co-pending application U.S. Ser. No. 14/081,089 titled "Mixed Fluid Filtration System.") However, one problem with traditional grey water reservoirs 12 is that access to the inner filter 14 for purpose of replacement can be difficult. Replacement of the filter can present various challenges due to space considerations, time considerations, and cleanliness issues. In many instances, it is necessary to remove the entire system as illustrated by FIG. 1B, including the related electronics board, in order to simply replace the filter. This can be invasive to the system and time intensive.

Traditional grey water reservoirs 12 may also present maintainability challenges. For example, the interior of the reservoir 12 may become coated with detergents, bacteria, mold, or other undesirable organisms or coatings. This build-up can interfere with water level sensor reliability. This may require a cleaning of the reservoir 12 and perhaps a complete replacement thereof. However, removal of the reservoir 12 means removal of the entire system 10 illustrated by either FIG. 1A or 1B. This means undesirable down-time of the aircraft. This may also mean that a spare unit must be kept on-hand at all times, which is an expensive and heavy part.

In the original concept, the filter in the GWF was a major component to be replaced due to its inherency for clogging and degradation of filtration characteristics. Similar concerns are seen in typical water filtration systems. However, another implication in replacing the filter is the exposure of maintenance personnel to potentially harmful substances or debris which may be trapped within the filter. Through the development process outlined above, the present inventors determined that modularity was an important aspect of installation of a grey water flush system. Quick turnaround of the system can be critical to increasing aircraft uptime. It was determined that providing modularity could allow operators to quickly replace components that require servicing, while leaving components not requiring service in place and generally untouched. There is thus provided a more easily removable and replaceable reservoir component, wherein such removal and replacement can be done within a short window of time and without removing the entire GWF or any other components thereof. In use, rather than removing the filter 14 from the reservoir 12, the entire reservoir assembly 40 (including the reservoir body 42 and filter 14) may be removed and exchanged for a fresh assembly. This design allows for limited contact of all personnel with potentially harmful substances/debris and quick replacement of the reservoir which can be prone to clogging concerns. The design described allows the user to avoid direct content with contents of the reservoir assembly 40 during removal and replacement. The design also offers ease of removal and disposal of the reservoir assembly 40 without the need for tooling. This can increase system uptime by allowing replacement of reservoirs and filters during regular servicing between flights.

Although the disposable modular reservoir is primarily described with respect to a grey water flush system, it should be understood that other modular reservoirs are possible and considered within the scope of this disclosure.

Figure 2B:
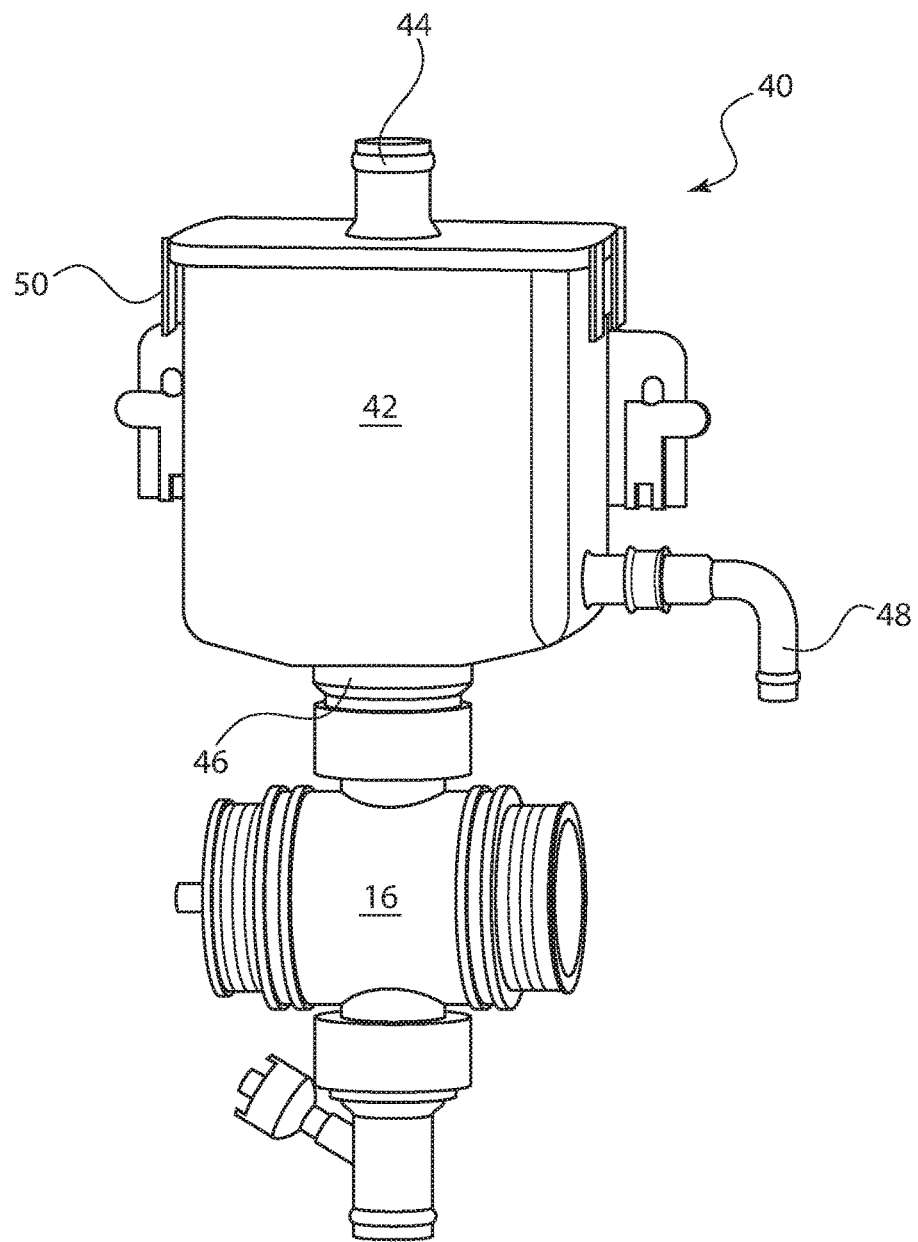
FIG. 2B shows a side perspective view of one embodiment of a disposable modular reservoir.

FIG. 2B illustrates improvements to the system 10 that incorporate modularity. The improved reservoir assembly 40 is provided as a reservoir body 42 that may be modular and disposable. Providing a modular and disposable reservoir can help ease maintenance by reducing the potential risk of exposure of the maintenance crew to potential microbiological hazards and reducing the risk of mechanical maintenance issues. It can also allow a faster turn-around time for repairs and in the event of component failure. It can also reduce the risk of bacterial and biofilm growth or coatings on system components.

The reservoir assembly 40 disclosed may be designed to be completely separable from all other components of the GWF system 10. As illustrated, the reservoir body 42 has at least one inlet 44. The inlet 44 is generally configured to cooperate with a water outlet from a sink basin. (Such cooperation will be described in more detail below.) The reservoir body 42 also has a first outlet 46 that is generally configured to cooperate with a pinch valve 16. The reservoir body 42 may also be provided with a second outlet 48. In use, the second outlet 48 may be fluidly connected to a toilet flushing system, such that filtered grey water may be delivered into that system (or any other system).

The reservoir body 40 may also have one or more optional side latches 50. Side latches 50 may be provided in order to allow the reservoir body 42 to be operable/accessible. For example, the reservoir body 42 may have a lid 43 that is secured to the body 42 via latches 50. it may be possible to open the one or more latches 50 in order to remove the reservoir body 42 from the reservoir assembly 40. For example, this may be beneficial in order to allow a filter positioned within the reservoir body 42 to be removable.

A filter or a filter system 14 may be positioned between the inlet 44 and the outlet 46. The filter system may help filter incoming water. One example of a potential filter system is disclosed by co-pending U.S. Ser. No. 14/081,089, but it should be understood that any other filter system may be used. However, instead of removing and replacing the filter from the reservoir and cleaning the reservoir, the entire reservoir and filter may be removable and disposable. In use, maintenance personnel may remove the reservoir body 42 (with the filter contained therein and replace the body with a fresh new reservoir body 42. The design disclosed allows this replacement to occur without direct contact with the contents of the reservoir. The design also offers ease of removal and disposal without the need for tooling.

In one example, the components may be secured to one another via clamshell-style connections (e.g., between all components for the reservoir, pinch valve, pump, and accumulators) to allow for quick disconnection. Additionally or alternatively, a tab-and-slot release system may be used on the back plate skeleton 52 for modularity.

Figure 5:
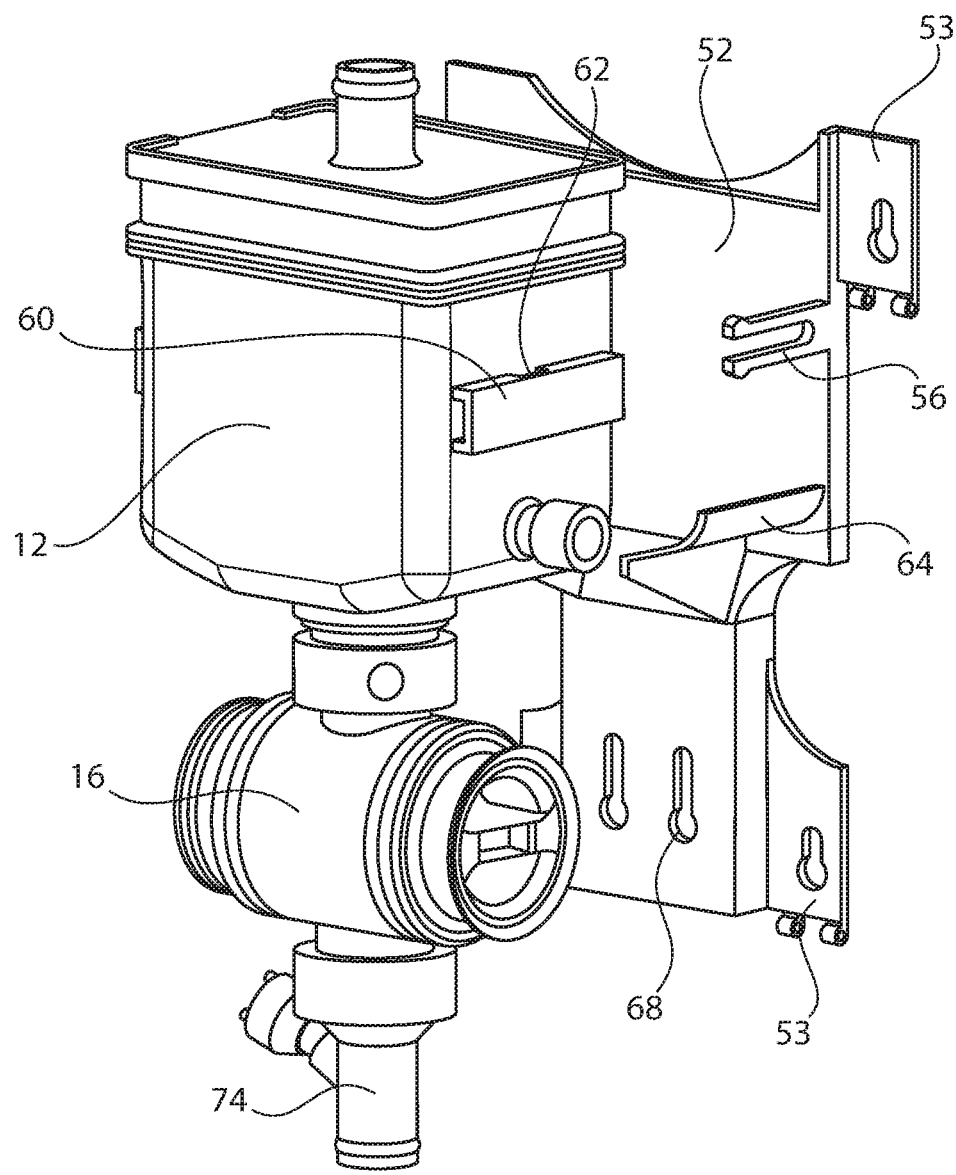
FIG. 5 shows a side perspective view of a back plate skeleton with a removable reservoir.

In one example, the reservoir assembly 40 may be provided as cooperable with a back plate skeleton 52. As illustrated by FIG. 5, the back plate skeleton 52 may have one or more mounting locations 53 for securing the back plate skeleton 52 to a surface. In one example, the surface is an aircraft lavatory wall, such as in a cabinet below the aircraft lavatory sink. The back plate skeleton 52 may have one or inure attachment feature 54 for removably receiving the reservoir body 42 and for allowing the attachment of the reservoir body 42 thereto. The attachment features 54 may use any appropriate attachment method, non-limiting examples of which are shown and described.

Figure 6:
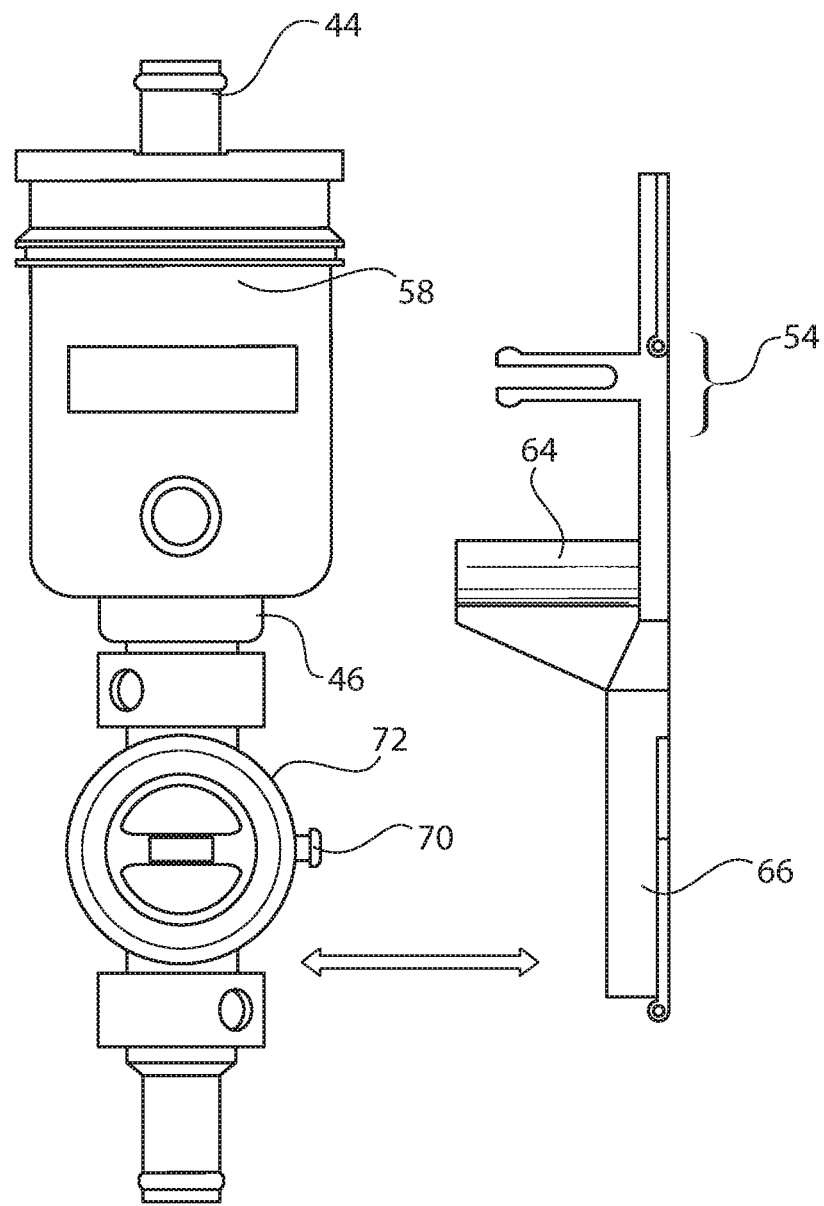
FIG. 6 shows a side plan view of the system of FIG. 5.

As shown in FIGS. 5 and 6, the attachment feature may be provided as one or more flanged arms 56. The reservoir body 42 may have a corresponding attachment feature 58. As illustrated by FIG. 5, the attachment feature 58 may be a bridge 60 with one or more openings 62 configured to receive the one or more flanged arms 56 of the back plate skeleton 52. Cooperation between the bridge 60 and the one Of more flanged arms 56 can affect secure attachment between the back plate skeleton 52 and the reservoir body 42. In order to remove the reservoir body 42, a user may pinch the flanged arms 56 inwardly by accessing them through the opening 62 and causing them to disengage from opening edges. As illustrated, the back plate skeleton 52 may also have one or more cradle portions 64 for securing and supporting the reservoir body 42.

Figure 4:
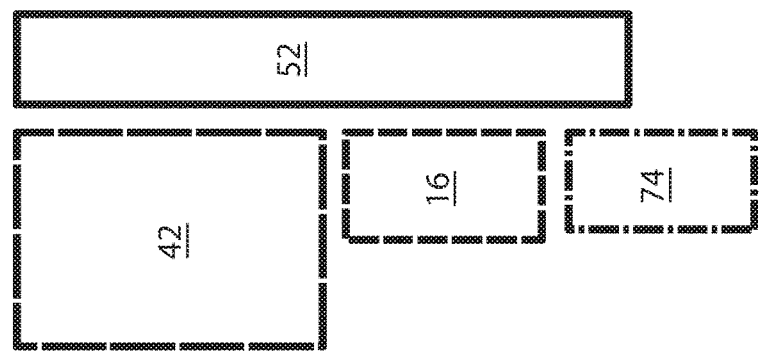
FIG. 4 shows a schematic illustration of the system of FIG. 3
Figure 3:
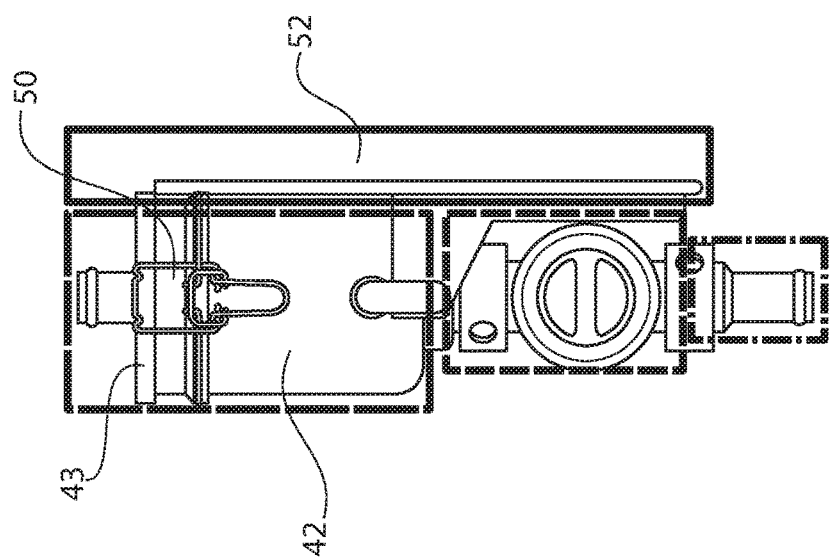
FIG. 3 shows a side plan view of one embodiment of a disposable modular reservoir.

The back plate skeleton 52 may also have a lower extension 66. Lower extension 66 may be configured to support the pinch valve 16. In one example, the lower extension 66 may have one or more slots 68 configured to receive one or more protrusions 70 on a rear surface 72 of the pinch valve 16. These separate securement locations may allow removal of the reservoir body 42 separately from removal of the pinch valve 16. As illustrated by the schematic of FIG. 4, the reservoir body 42 and the pinch valve 16 may be separately removable from the back plate skeleton 52. In one example, a drain valve 74 may cooperate with the pinch valve 16. The drain valve 74 may be secured directly to the pinch valve 16 or it may be removably secured to the back plate skeleton 52 using any appropriate attachment system, including any of the above-discussed options.

In order to provide such separate removability, one or more clamps 76 may be provided at water interfaces between components. For example, there may be a hydroclamp 76 provided in order to secure a wash basin outlet 80 with a reservoir body inlet 44. It is also possible to provide a sleeve 78 that may bridge one or more of these water interfaces. The sleeve 78 may be positioned within an internal diameter of the wash basin outlet 80, as well as within an internal diameter of the reservoir body inlet 44. This can help align the interfaces with respect to one another. Once positioned as desired, hinged arms 116 of a hydroclamp 76 may open and be positioned around the interfaces 80, 44. It is possible for the interfaces 80, 44 to be provided with one or more seals 118, which can help the elements be watertight with respect to one another. Exemplary seals include o-ring seals. Once the hydroclamp 76 has been positioned, the wash basin outlet 80 may be secured to the water reservoir inlet 44. When removability of the reservoir body 42 is desired, a user may release the clamp 76 in order to cause the inlet 44 to be removed from the wash basin outlet 80. The clamp 76 may be a hydroclamp, a clam-shell clamp, or any other appropriate clamp that can secure two components together in a water-tight manner but allow a quick release therebetween. One exemplary clamp that has been found to be useful is the Hydraflow clamp manufactured and distributed by JLS Motorsport of England.

Figure 12:
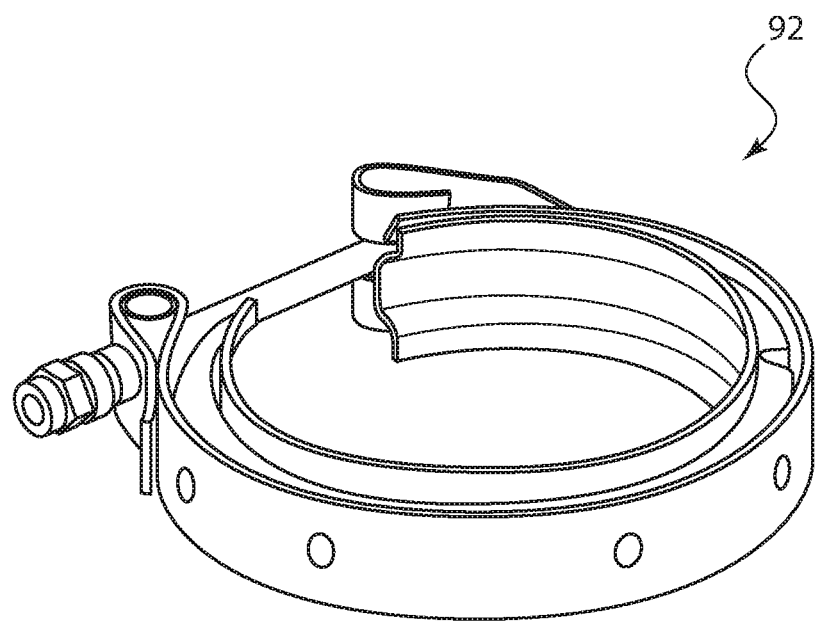
FIG. 12 shows a side perspective view of an alternate embodiment of a clamp for securing a disposable reservoir in place.

In another example, a V clamp 92 may be positioned with respect to the back plate skeleton 52. An exemplary the clamp 92 is illustrated by FIG. 12. The V clamp may open in order to secure one or more of the inlet 44 and/or the outlet 46 of the reservoir body 42 to the back plate skeleton 52. In use, a user may open the V clamp 92 in order to release the reservoir body 42 from the back plate skeleton 52.

Figure 7:
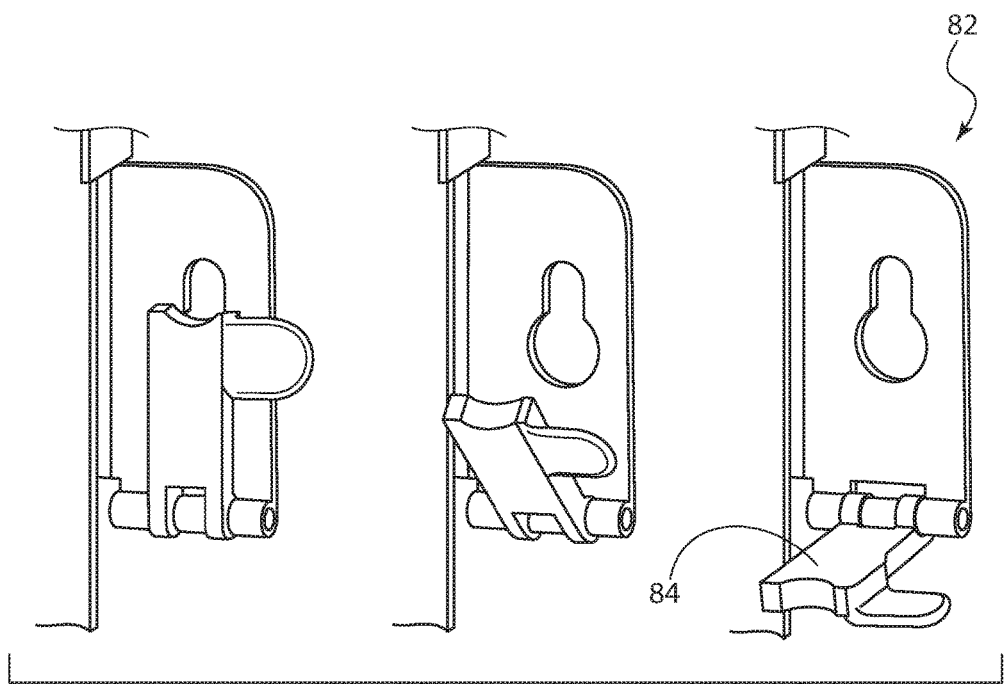
FIG. 7 shows e embodiment of a mounting system.
Figure 8:
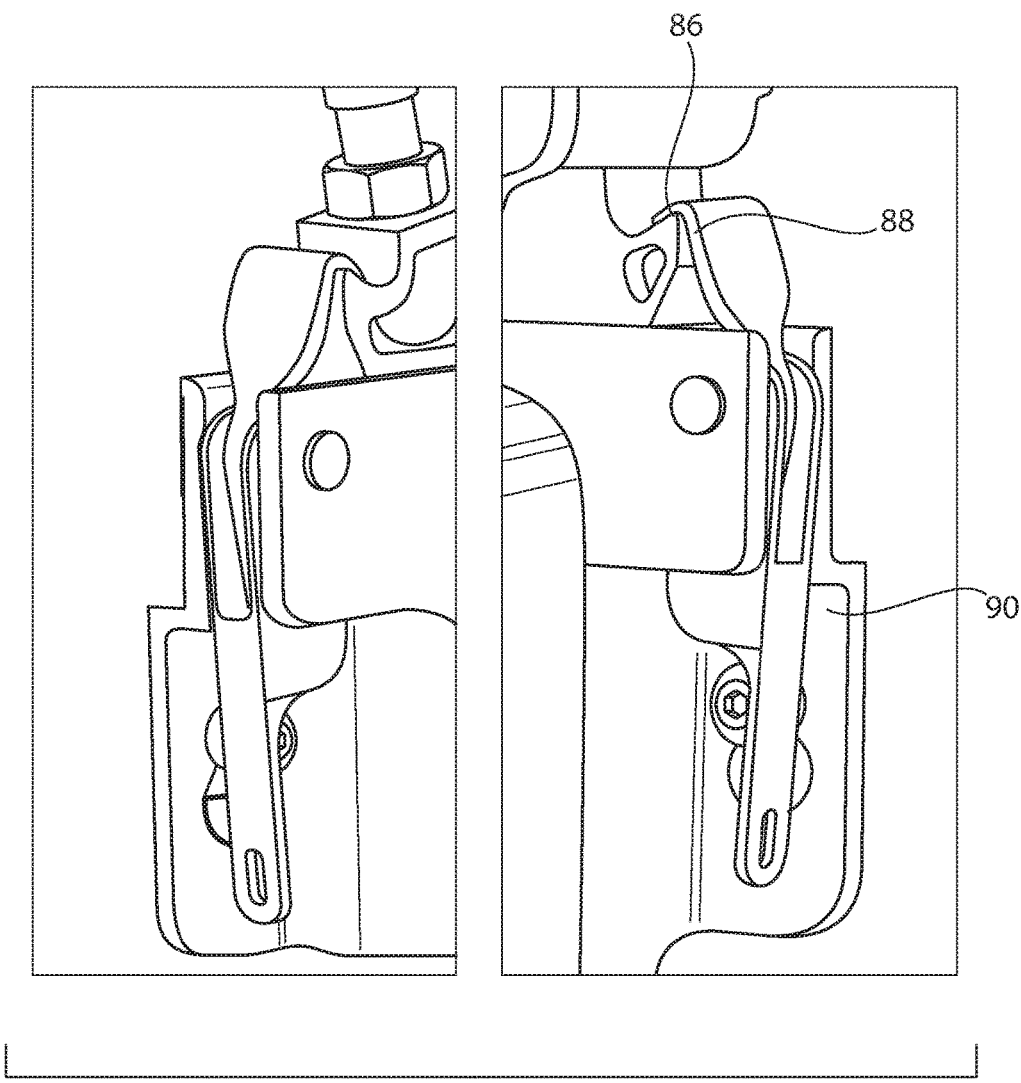
FIG. 8 shows another embodiment of a mounting system.

FIGS. 7 and 8 illustrate exemplary disconnect mounts that may be used to secure the back plate skeleton 52 to an aircraft surface. Exemplary disconnect mounts 82 are illustrated by FIG. 7. As shown, the disconnect mounts 82 may have a lever arm 84 that may be raised in order to secure the back plate skeleton in place. In another example, the disconnect mounts may work via cooperation between an interlocking protrusion 86 and a recess 88, as illustrated by FIG. 8. The recess may be positioned at the end of a movable arm 90, and the movable arm 90 may be maneuvered in order to cause the recess 88 to cooperate with the interlocking protrusion 86. The disconnect mounts may also be used to secure the reservoir body 42 to the back plate skeleton 52. It is generally envisioned that such disconnect mounts are tool free, such that a maintenance personnel simply need to pull the lever via hand.

Figure 9:
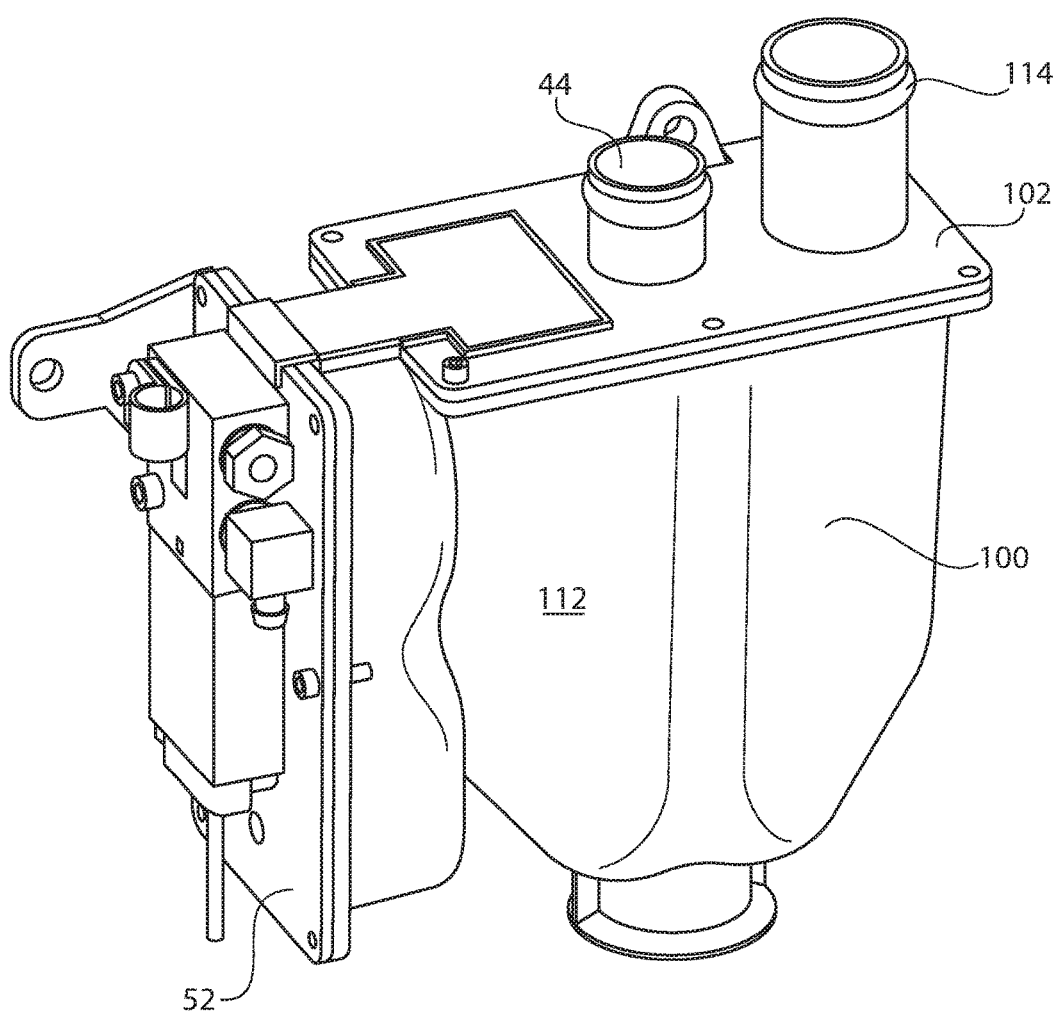
FIG. 9 shows a side perspective view of an alternate embodiment of a reservoir system.
Figure 10:
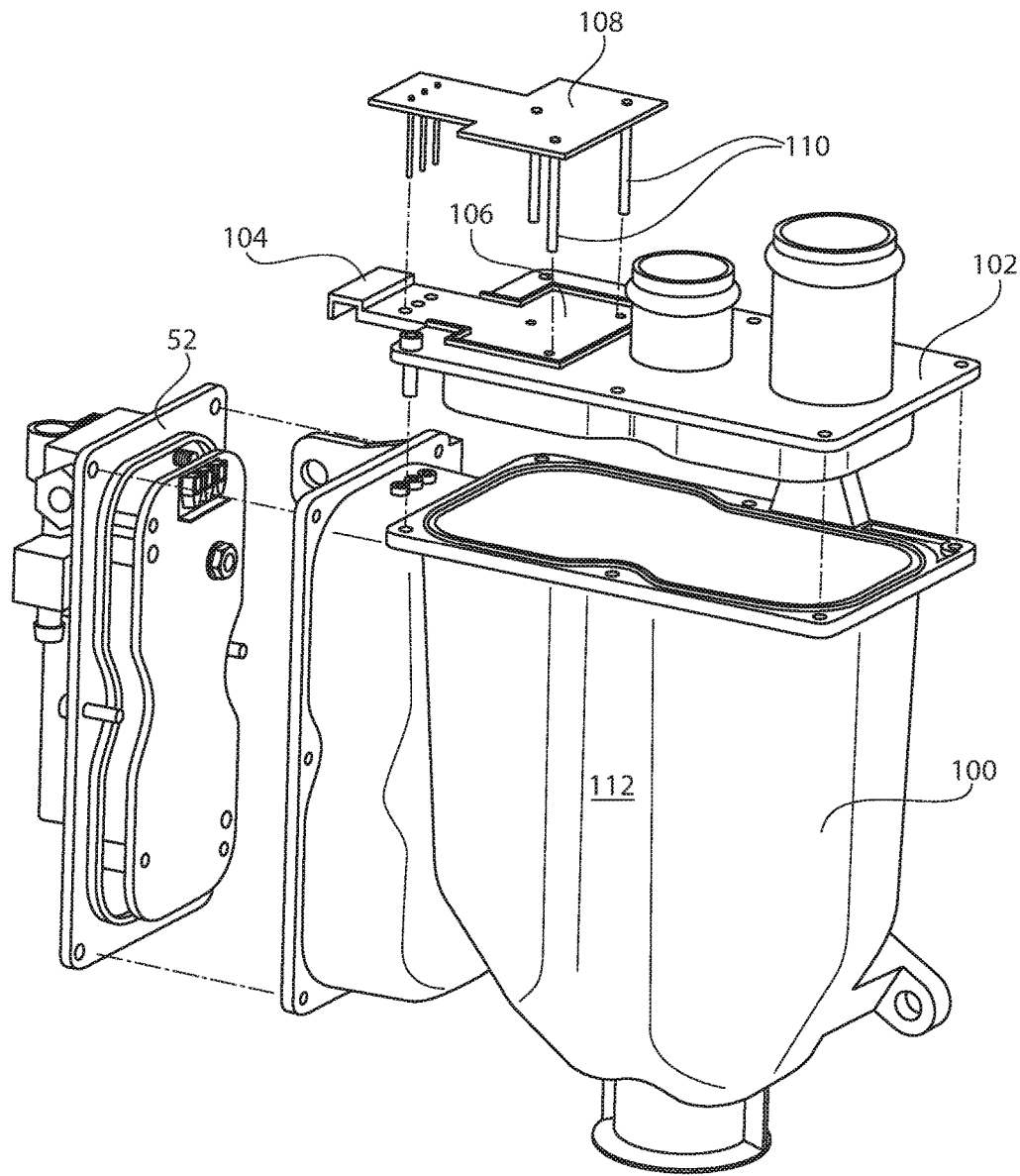
FIG. 10 shows an exploded view of the system of FIG. 9.
Figure 11:
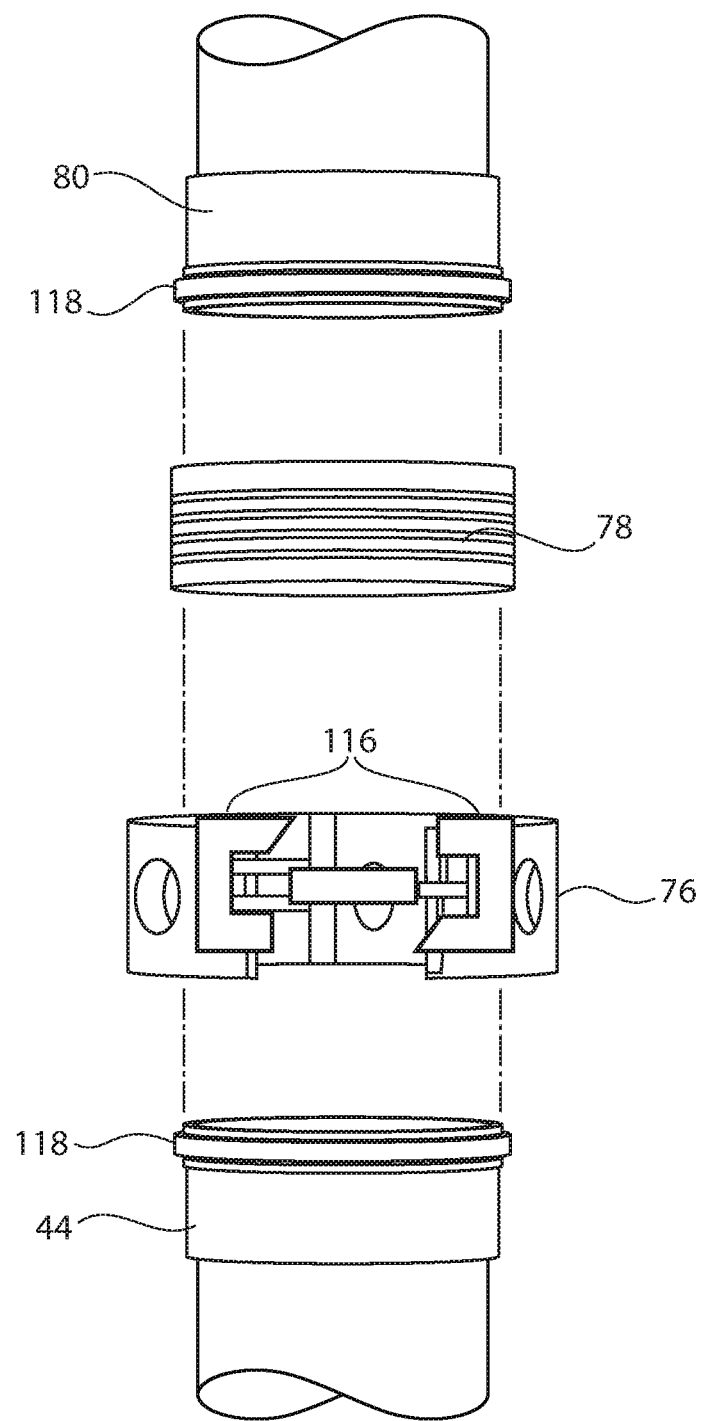
FIG. 11 shows a side perspective view of one embodiment of a clamp for securing a disposable reservoir in place.

FIG. 9 illustrates one embodiment of a reservoir body 100 with a reservoir top 102 that can remain positioned on the back plate skeleton 52. The top 102 may include the inlet 44, as well as a vent tube 114. In one example, the top 102 may have a connection flange 104 that secures to the back plate 52. The top 102 may also have a sensor receiving portion 106. The sensor receiving portion 106 may support or align a sensor system 108 with respect to the reservoir 100. For example, the sensor system 108 may have one or more sensing conductive electrodes 110 that can extend into the reservoir 100 in order to monitor water level, water quality, pressure, or any other feature. The sensor system 108 may be integral with the top 102 or it may be separate element, as illustrated by FIG. 10. In either example, the reservoir body 112 can be removed from the back plate 52 and top 102, so that only the reservoir body 112 need be replaced. This can allow the sensor system 108 and any other electronic components associated with the back plate 52 to stay in place. The reservoir body 112 may be removed from the top 102/back plate 52 via clamps, screws, or any other system that allows a quick release. The release system may be any system that can maintain pressure inside the reservoir body 112 such that the system can operate under vacuum. The release system may also be designed to maintain a water-tight connection between the body 112 and the top 102.

In another example, one or more water sensors may be capacitive sensors that are positioned along the back plate skeleton 52. Such capacitive sensors can detect water levels without requiring water/liquid contact. In this embodiment, the back plate skeleton may support a printed circuit board, capacitive sensors, and any other related electronics for the system. The reservoir body may be removed and replaced, leaving the electronics in place.

Changes and modifications, additions and deletions may be made to the structures and methods recited above and shown in the drawings without departing from the scope or spirit of the disclosure or the following claims.

What is claimed is:

1. A removable reservoir for a water system, comprising:
    a back plate configured to be mounted to a surface and comprising at least one attachment feature;
    a reservoir assembly comprising a reservoir body and a reservoir top, the reservoir body configured to be removable from the reservoir top, the reservoir top configured to remain installed with respect to the back plate, the reservoir top comprising an inlet configured to cooperate with a water outlet from a sink basin, the reservoir body comprising at least one outlet and a corresponding attachment feature for securement of the reservoir body to the back plate; and
    a system for securing and releasing the reservoir body to and from the reservoir top.

2. The system of claim 1, wherein the reservoir top cooperates with a sensor system that detects a liquid level in the reservoir body.

3. The system of claim 1, further comprising a clamp for securing the inlet to a water pipe, wherein release of the reservoir body from the water pipe is caused by the user's manual release of the clamp.

4. The system of claim 1, wherein the reservoir top further comprises a vent tube.

5. A removable reservoir for a water system, comprising:
    a back plate configured to be mounted to a surface and comprising at least one attachment feature;
    a reservoir assembly comprising a reservoir body and a reservoir top, the reservoir body configured to be removable from the reservoir top, the reservoir top configured to remain installed with respect to the back plate, the reservoir top comprising an inlet configured to cooperate with a water outlet from a sink basin, the reservoir body comprising at least one outlet and a corresponding attachment feature for securement of the reservoir body to the back plate; and
    a system for securing and releasing the reservoir body to and from the reservoir top, wherein the reservoir top further comprises a connection flange configured to secure the reservoir top to the back plate.

6. The system of claim 1, wherein the reservoir top further comprises a sensor receiving portion that receives and aligns a sensor system with respect to the reservoir body once assembled.

7. The system of claim 1, further comprising a sensor system comprising one or more conductive electrodes that extend into the reservoir in order to monitor water level, water quality, pressure, or any combination thereof.

8. The system of claim 7, wherein the sensor system is integral with the reservoir top.

9. The system of claim 7, wherein the sensor system is a separate element that is mounted with respect to the reservoir top.

10. The system of claim 1, wherein the reservoir body is configured to be removable from the reservoir top and any related components such that the reservoir body can be disposed and replaced with a new removable reservoir.

* * * * *